US009479306B2

(12) United States Patent
Mazzarese et al.

(10) Patent No.: US 9,479,306 B2
(45) Date of Patent: Oct. 25, 2016

(54) METHOD AND DEVICE FOR REPORTING REFERENCE SIGNAL RECEIVED POWER

(71) Applicant: Huawei Technologies Co., Ltd., Shenzhen, Guangdong (CN)

(72) Inventors: David Mazzarese, Beijing (CN); Liang Xia, Shenzhen (CN); Mingyu Zhou, Shenzhen (CN); Jingyuan Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 14/538,571

(22) Filed: Nov. 11, 2014

(65) Prior Publication Data

US 2015/0063287 A1   Mar. 5, 2015

Related U.S. Application Data

(63) Continuation of application No. PCT/CN2013/075102, filed on May 3, 2013.

(30) Foreign Application Priority Data

May 11, 2012 (CN) .......................... 2012 1 0146587

(51) Int. Cl.
*H04L 5/00* (2006.01)
*H04W 24/10* (2009.01)
*H04B 7/06* (2006.01)

(52) U.S. Cl.
CPC ............ *H04L 5/0048* (2013.01); *H04B 7/0626* (2013.01); *H04L 5/0053* (2013.01); *H04L 5/0057* (2013.01); *H04W 24/10* (2013.01); *H04L 5/0023* (2013.01); *H04L 5/0035* (2013.01)

(58) Field of Classification Search
CPC  H04W 24/10; H04W 72/044; H04W 72/085
See application file for complete search history.

(56) References Cited

U.S. PATENT DOCUMENTS 8,861,430 B2 *  10/2014  Liao .................... H04B 7/0626
                                                  370/318

FOREIGN PATENT DOCUMENTS

CN       102244923 A      11/2011
CN       102291812 A      12/2011
(Continued)

OTHER PUBLICATIONS

"Modification to the RSRP definition", Nokia, 3GPP TSG-RAN Meeting #53bis, Jun. 30-Jul. 4, 2008, 2 pages.
(Continued)

*Primary Examiner* — Chandrahas Patel (57) ABSTRACT

Embodiments of the present invention provide a method and device for reporting reference signal received power. A base station determines at least one first channel-state information reference signal CSI-RS resource used by a terminal to report reference signal received power RSRP, where the first CSI-RS resource includes at least one antenna port group, and the antenna port group includes at least one antenna port; the base station sends first CSI-RS resource configuration information to the terminal, where the first CSI-RS resource configuration information carries the at least one first CSI-RS resource; and the base station receives RSRP that is of each antenna port group included in the first CSI-RS resource and is reported by the terminal. The embodiments of the present invention save overheads of reporting RSRP.

18 Claims, 5 Drawing Sheets

(56) References Cited

FOREIGN PATENT DOCUMENTS

WO  WO 2011/100676 A1  8/2011
WO  WO 2011/162663 A1  12/2011

OTHER PUBLICATIONS

"Aggregated CSI feedback with power imbalance", Intel Corporation, 3GPP TSG RAN WG1 Meeting #67, Nov. 14-18, 2011, 3 pages.
"CoMP Feedback based on Multiple CSI-RS Resources", Alcatel-Lucent Shanghai Bell, 3GPP TSG RAN WG1 Meeting #67, Nov. 14-18, 2011, 6 pages.
"Determination of CoMP Measurement and Reporting Sets", Ericsson, 3GPP TSG-RAN WG1 #67, Nov. 14-18, 2011, 2 pages.
"Use of CSI-RS for CoMP Measurement Set Management", Ericsson, 3GPP TSG-RAN WG1 #68, Feb. 6-10, 2012, 3 pages.
"CoMP Operation and UE Mobility", Alcatel-Lucent, 3GPP TSG RAN WG1 meeting #68, Feb. 6-10, 2012, 5 pages.
"Inter-CSI-RS-resource amplitude feedback", Alcatel-Lucent Shanghai Bell, 3GPP TSG RAN WG1 Meeting #68, Feb. 6-10, 2012, 4 pages.
"Uplink Power Control Discussion for CoMP Scenario 4", Intel Corporation, 3GPP TSG-RAN WG1 #65, May 9-13, 2011, 16 pages.

\* cited by examiner

METHOD AND DEVICE FOR REPORTING REFERENCE SIGNAL RECEIVED POWER

CROSS-REFERENCE TO RELATED APPLICATION

This application is a continuation of International Application No. PCT/CN2013/075102, filed on May 3, 2013, which claims priority to Chinese Patent Application No. 201210146587.8, filed on May 11, 2012, both of which are hereby incorporated herein by reference in their entireties.

TECHNICAL FIELD

The present invention relates to communications technologies, and in particular, to a method and device for reporting reference signal received power.

BACKGROUND

In a coordinated multiple point transmission and reception (Coordinated Multiple Point Transmission and Reception, CoMP) system, one or more access points (Access Point, AP) send data for a user equipment (User Equipment, UE), or receive data sent by the UE. The UE needs to measure and report, to a base station, channel-state information (Channel-State Information, CSI) of the one or more access points, and a reference signal used to measure the CSI is a channel-state information reference signal (Channel-State Information Reference Signal, CSI-RS). Generally, the UE further needs to measure and report reference signal received power (Reference Signal Receiving Power, RSRP) to the base station; and the base station needs to determine, for the UE according to the RSRP reported by the UE, a set of access points that provide a service, or determine, according to the RSRP reported by the UE, a set of access points whose CSI needs to be reported by the UE.

In the prior art, the UE separately measures the RSRP and reports measured RSRP to the base station according to each antenna port of each CSI-RS resource in an RSRP measurement set. This method incurs high reporting overheads.

SUMMARY

Embodiments of the present invention provide a method and device for reporting reference signal received power, so as to save overheads of reporting RSRP.

According to one aspect, an embodiment of the present invention provides a method for reporting reference signal received power, including:

determining, by a base station, at least one first channel-state information reference signal CSI-RS resource used by a terminal to report reference signal received power RSRP, where the first CSI-RS resource includes at least one antenna port group, and the antenna port group includes at least one antenna port;

sending, by the base station, first CSI-RS resource configuration information to the terminal, where the first CSI-RS resource configuration information carries the at least one first CSI-RS resource; and receiving, by the base station, RSRP that is of each antenna port group included in the first CSI-RS resource and is reported by the terminal.

An embodiment of the present invention further provides a method for reporting reference signal received power, including:

receiving, by a terminal, first channel-state information reference signal CSI-RS resource configuration information sent by a base station, where the first CSI-RS resource configuration information carries at least one first CSI-RS resource used by the terminal to report reference signal received power RSRP, the first CSI-RS resource includes at least one antenna port group, and the antenna port group includes at least one antenna port;

measuring, by the terminal according to the first CSI-RS resource configuration information, RSRP of each antenna port group included in the first CSI-RS resource; and reporting, by the terminal to the base station, the RSRP that is of each antenna port group included in the first CSI-RS resource and is obtained by measurement.

According to another aspect, an embodiment of the present invention further provides a base station, including:

a configuration unit, configured to determine at least one first channel-state information reference signal CSI-RS resource used by a terminal to report reference signal received power RSRP, where the first CSI-RS resource includes at least one antenna port group, and the antenna port group includes at least one antenna port;

a sender, configured to send first CSI-RS resource configuration information to the terminal, where the first CSI-RS resource configuration information carries the at least one first CSI-RS resource; and a receiver, configured to receive RSRP that is of each antenna port group included in the first CSI-RS resource and is reported by the terminal.

According to another aspect, an embodiment of the present invention further provides a terminal, including:

a receiver, configured to receive first channel-state information reference signal CSI-RS resource configuration information sent by a base station, where the first CSI-RS resource configuration information carries at least one first CSI-RS resource used by the terminal to report reference signal received power RSRP, the first CSI-RS resource includes at least one antenna port group, and the antenna port group includes at least one antenna port;

a measurement unit, configured to measure, according to the first CSI-RS resource configuration information, RSRP of each antenna port group included in the first CSI-RS resource; and a sender, configured to report to the base station the RSRP that is of each antenna port group included in the first CSI-RS resource and is obtained by measurement.

According to the method and device for reporting reference signal received power provided in the embodiments of the present invention, the base station sends, to the terminal, CSI-RS resource configuration information that is used by the terminal to report RSRP and includes antenna port groups, so that the terminal measures RSRP of each antenna port group and reports the RSRP to the base station, thereby saving overheads of reporting RSRP.

According to still another aspect, an embodiment of the present invention further provides another method for reporting reference signal received power, including:

determining, by a base station, at least one second channel-state information reference signal CSI-RS resource not used by a terminal to report reference signal received power RSRP;

sending, by the base station, second CSI-RS resource configuration information to the terminal, where the second CSI-RS resource configuration information carries the at least one second CSI-RS resource; and receiving, by the base station, RSRP that is of each fourth CSI-RS resource and is reported by the terminal, where the fourth CSI-RS resource is determined by the terminal according to a CSI-RS resource available to the terminal and the second CSI-RS resource.

An embodiment of the present invention further provides still another method for reporting reference signal received power, including:

receiving, by a terminal, second channel-state information reference signal CSI-RS resource configuration information sent by a base station, where the second CSI-RS resource configuration information carries at least one second CSI-RS resource, and the second CSI-RS resource is not used by the terminal to report reference signal received power RSRP;

determining, by the terminal according to a CSI-RS resource available to the terminal and the second CSI-RS resource, a fourth CSI-RS resource used to report RSRP;

measuring, by the terminal, RSRP of each fourth CSI-RS resource; and reporting, by the terminal to the base station, the RSRP that is of each fourth CSI-RS resource and is obtained by measurement.

According to another aspect, an embodiment of the present invention further provides a base station, including:

a configuration unit, configured to determine at least one second channel-state information reference signal CSI-RS resource not used by a terminal to report reference signal received power RSRP;

a sender, configured to send second CSI-RS resource configuration information to the terminal, where the second CSI-RS resource configuration information carries the at least one second CSI-RS resource; and a receiver, configured to receive RSRP that is of each fourth CSI-RS resource and is reported by the terminal, where the fourth CSI-RS resource is determined by the terminal according to a CSI-RS resource available to the terminal and the second CSI-RS resource.

An embodiment of the present invention further provides a terminal, including:

a receiver, configured to receive second channel-state information reference signal CSI-RS resource configuration information sent by a base station, where the second CSI-RS resource configuration information carries at least one second CSI-RS resource, and the second CSI-RS resource is not used by the terminal to report reference signal received power RSRP;

a processing unit, configured to determine, according to a CSI-RS resource available to the terminal and the second CSI-RS resource, a fourth CSI-RS resource used to report RSRP;

a measurement unit, configured to measure RSRP of each fourth CSI-RS resource; and a sender, configured to report to the base station the RSRP that is of each fourth CSI-RS resource and is obtained by measurement.

According to the method and device for reporting reference signal received power provided in the embodiments of the present invention, the base station sends, to the terminal, CSI-RS resource configuration information that is not used by the terminal to report RSRP, so that the terminal determines, according to the available CSI-RS resource and a CSI-RS resource for skipping reporting RSRP, a CSI-RS resource used to report RSRP, measures RSRP on the determined CSI-RS resource and reports the RSRP to the base station, thereby saving overheads of reporting RSRP.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
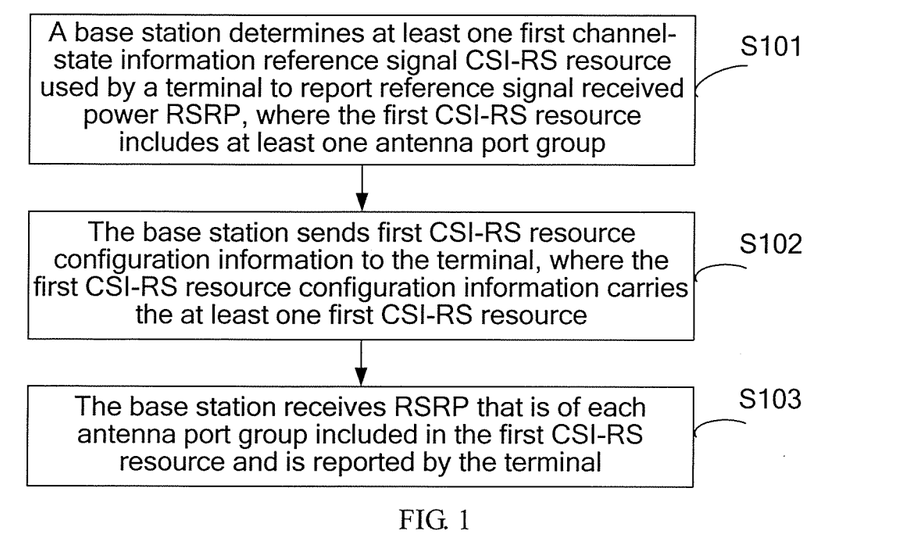
FIG. 1 is a flowchart of an embodiment of a method for reporting reference signal received power according to the present invention.

FIG. 1 is a flowchart of an embodiment of a method for reporting reference signal received power according to the present invention. As shown in FIG. 1, the method includes:

S101. A base station determines at least one first channel-state information reference signal (CSI-RS) resource used by a terminal to report reference signal received power RSRP, where the first CSI-RS resource includes at least one antenna port group, and the antenna port group includes at least one antenna port.

S102. The base station sends first CSI-RS resource configuration information to the terminal, where the first CSI-RS resource configuration information carries the at least one first CSI-RS resource.

S103. The base station receives RSRP that is of each antenna port group included in the first CSI-RS resource and is reported by the terminal.

The foregoing steps are performed by a base station, which may specifically be an evolved Node B (Evolved Node B, eNB), and may also be a radio network controller (Radio Network Controller, RNC) and the like.

RSRP involved in the embodiment of the present invention may refer to an average value of power of signals that are received in all resource elements (Resource Element, RE) that carry corresponding CSI-RSs, within two orthogonal frequency division multiplexing (Orthogonal Frequency Division Multiplexing, OFDM) symbols. The RSRP may also refer to a ratio of the RSRP to a received signal strength indicator (Received Signal Strength Indicator, RSSI), and the ratio is reference signal received quality (Reference Signal Receiving Quality, RSRQ). The RSSI indicates an average value of power of all signals (including a pilot signal, a data signal, a neighboring cell interfering signal, a noise signal, and the like) received within an OFDM symbol. Because the RSRP and the RSSI may be measured based on different bandwidths, RSRQ=N*RSRP/RSSI, where N is an adjustment coefficient, and the RSSI may indicate an average value of power (including reference signal power, neighboring cell interfering signal, noise power, and the like) of all REs of CSI-RSs received within an OFDM symbol. The RSRQ may also be a ratio of the RSRP to interfering noise power, and the interfering noise power may include neighboring cell interfering power, noise power, and the like.

CSI-RS resources involved in this embodiment may refer to resources in a dimension such as a time domain, a frequency domain, or a subcarrier. Because each CSI-RS resource may include 1, 2, 4, 8 or another number of antenna ports, each CSI-RS resource may be mapped to one or more access points (Access Point, AP), and each antenna port of each CSI-RS resource may be mapped to one or more physical antennas at an AP, the base station may determine, according to factors such as a mapping relationship between antenna ports included in all CSI-RS resources and the physical antennas at the AP, and an actual requirement, the at least one first CSI-RS resource used by the terminal to report the RSRP, where the first CSI-RS resource includes the at least one antenna port group, and the antenna port group includes the at least one antenna port.

Specifically, the base station may use a CSI-RS resource, for which RSRP needs to be reported, in physical antennas, to which antenna ports are mapped, of different APs as a first CSI-RS resource, and use antenna ports, which are mapped to physical antennas at a same site, in the CSI-RS resource as an antenna port group, where a quantity of antenna ports included in each antenna port group may be a quantity of antenna ports, which are mapped to the physical antennas at the same site, in the CSI-RS resource; or the base station may also use a CSI-RS resource, for which RSRP needs to be reported, in physical antennas, to which antenna ports are mapped, of different APs as a first CSI-RS resource, and use a greatest common divisor of quantities of antenna ports, which are mapped to physical antennas at a same site, in the CSI-RS resource as a quantity of antenna ports included in an antenna port group, where a quantity of antenna port groups included in the CSI-RS resource is equal to a quantity of antenna ports included in the CSI-RS resource divided by the quantity of antenna ports included in the antenna port group. Only several feasible implementation manners of determining, by a base station, at least one antenna port group included in a first CSI-RS resource are provided in the foregoing description, which shall, however, not be construed as a limitation on the embodiment of the present invention.

An antenna port group includes one or more antenna ports in any first CSI-RS resource. The first CSI-RS resource determined by the base station may include an antenna port group, and in such an implementation scenario, all antenna ports in the first CSI-RS resource form an antenna port group; or the first CSI-RS resource determined by the base station may include multiple antenna port groups, and in such an implementation scenario, one or more antenna ports in the first CSI-RS resource may form an antenna port group. For example, if the first CSI-RS resource includes 4 antenna ports, every two antenna ports may form an antenna port group, and the first CSI-RS resource may include 2 antenna port groups.

In the method for reporting reference signal received power provided in the embodiment of the present invention, the base station classifies the antenna ports included in the determined first CSI-RS resource used by the terminal to report the RSRP into at least one antenna port group, so that the terminal is capable of measuring RSRP of each antenna port group and reporting the RSRP to the base station without a need to measure RSRP of each antenna port and report the RSRP to the base station, thereby saving overheads of reporting the RSRP.

A quantity of antenna ports included in each antenna port group may be determined by the base station. The base station may notify, by using the first CSI-RS resource configuration information, the terminal of the quantity of antenna ports included in each antenna port group.

After receiving the RSRP, reported by the terminal, of each antenna port group included in the first CSI-RS resource, the base station may determine, according to the RSRP of each antenna port group, a set of access points that provide a service for the terminal, or determine a set of access points whose CSI needs to be reported by the terminal. That the base station determines, according to the RSRP of each antenna port group, a set of access points that provide a service for the terminal, or determines a set of access points whose CSI needs to be reported by the terminal may be implemented by using an existing method. For example, the base station may use an access point corresponding to maximum RSRP reported by the terminal as a main access point, and use an access point, which is corresponding to RSRP having a difference between the RSRP and the RSRP corresponding to the main access point within a threshold, as a coordinating access point. The base station uses the main access point and the coordinating access point as a set of access points that provide a service for the terminal or a set of access points whose CSI needs to be reported by the terminal.

According to the method for reporting reference signal received power provided in the embodiment of the present invention, the base station sends, to the terminal, CSI-RS resource configuration information that is used by the terminal to report RSRP and includes antenna port groups, so that the terminal measures RSRP of each antenna port group and reports the RSRP to the base station, thereby saving overheads of reporting RSRP.

Figure 2:
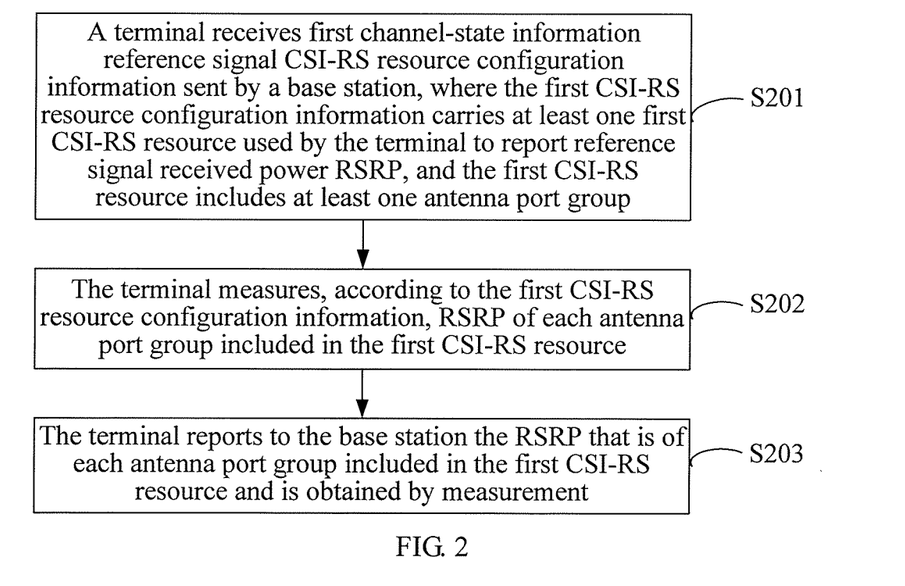
FIG. 2 is a flowchart of another embodiment of a method for reporting reference signal received power according to the present invention.

FIG. 2 is a flowchart of another embodiment of a method for reporting reference signal received power according to the present invention. As shown in FIG. 2, the method includes:

S201. A terminal receives first channel-state information reference signal CSI-RS resource configuration information sent by a base station, where the first CSI-RS resource configuration information carries at least one first CSI-RS resource used by the terminal to report reference signal received power RSRP, the first CSI-RS resource includes at least one antenna port group, and the antenna port group includes at least one antenna port.

S202. The terminal measures, according to the first CSI-RS resource configuration information, RSRP of each antenna port group included in the first CSI-RS resource.

S203. The terminal reports to the base station the RSRP that is of each antenna port group included in the first CSI-RS resource and is obtained by measurement.

The foregoing steps are performed by a UE.

The base station may determine, according to factors such as a mapping relationship between antenna ports included in all CSI-RS resources and physical antennas at an AP, and an actual requirement, that the at least one first CSI-RS resource used by the terminal to report the RSRP includes the at least one antenna port group, and the antenna port group includes the at least one antenna port.

After receiving the first CSI-RS resource configuration information sent by the base station, the terminal may correspondingly measure the RSRP of each antenna port group according to the antenna port group included in the one or more first CSI-RS resources carried in the first CSI-RS resource configuration information.

As a feasible implementation manner, the terminal may directly measure the RSRP of each antenna port group in each first CSI-RS resource, and report the RSRP of each antenna port group to the base station.

As another feasible implementation manner, the terminal may measure RSRP of each first CSI-RS resource and the RSRP of each antenna port group in the first CSI-RS resource, calculate a difference between the RSRP of the first CSI-RS resource and the RSRP of each antenna port group in the first CSI-RS resource, calculate a difference between the RSRP of each first CSI-RS resource and the RSRP of each antenna port group in the first CSI-RS resource, and then report the difference between the RSRP of each first CSI-RS resource and the RSRP of each antenna port group in the first CSI-RS resource to the base station.

As another feasible implementation manner, the terminal may further measure RSRP of any of the at least one first CSI-RS resource and RSRP of each antenna port group in all first CSI-RS resources, calculate a difference between the RSRP of the any of the at least one first CSI-RS resource and the RSRP of each antenna port group among RSRP of all the first CSI-RS resources, and report the difference between the RSRP of the any of the at least one first CSI-RS resource and the RSRP of each antenna port group among the RSRP of all the first CSI-RS resources to the base station.

Further, after measuring, according to the first CSI-RS resource configuration information, the RSRP of each antenna port group included in the first CSI-RS resource, the terminal may further obtain, according to the RSRP of each antenna port group, a sum or an average value or a weighted average value of the RSRP of all the antenna port groups included in the first CSI-RS resource, and report the sum or the average value or the weighted average value of the RSRP of all the antenna port groups included in the first CSI-RS resource to the base station, so that the base station can approximately determine total received signal power or average received signal power of the terminal according to the sum or the average value or the weighted average value of the RSRP of all the antenna port groups included in the first CSI-RS resource.

Because the terminal is capable of learning the first CSI-RS resource used to report RSRP and determined by the base station and a manner of classifying antenna ports included in the first CSI-RS resource, the terminal is capable of measuring RSRP of an antenna port group that includes at least one antenna port and reporting the RSRP to the base station, without a need to measure RSRP of each antenna port and report the RSRP to the base station, thereby saving overheads of reporting RSRP.

In the method for reporting reference signal received power provided in the embodiment of the present invention, the terminal receives CSI-RS resource configuration information that is sent by the base station, is used by the terminal to report RSRP, and includes antenna port groups, measures RSRP of each antenna port group and reports the RSRP to the base station, thereby saving overheads of reporting RSRP.

Based on the embodiments provided in FIG. 1 and FIG. 2, further, the base station may determine at least one third CSI-RS resource used by the terminal to report RSRP, where the third CSI-RS resource includes at least one antenna port; and send third CSI-RS resource configuration information to the terminal, where the third CSI-RS resource configuration information carries the at least one third CSI-RS resource. After receiving the third CSI-RS resource configuration information sent by the base station, the terminal measures RSRP of each third CSI-RS resource according to the third CSI-RS resource configuration information, and reports to the base station the RSRP that is of each third CSI-RS resource and is obtained by measurement. The base station receives the RSRP of each third CSI-RS resource reported by the terminal, and may determine, according to the RSRP of each third CSI-RS resource, a set of access points that provide a service for the terminal, or determine a set of access points whose CSI needs to be reported by the terminal.

Optionally, after measuring the RSRP of each third CSI-RS resource according to the third CSI-RS resource configuration information, the terminal may further obtain a sum or an average value or a weighted average value of RSRP of all the third CSI-RS resources according to the RSRP of each third CSI-RS resource, and report the sum or the average value or the weighted average value of the RSRP of all the third CSI-RS resources to the base station.

Optionally, the terminal may also measure and report a sum or an average value or a weighted average value of RSRP of all antenna port groups in each first CSI-RS resource and that of all the third CSI-RS resources.

In the foregoing embodiment, the base station can send the first CSI-RS resource configuration information and the third CSI-RS resource configuration information used by the terminal to report RSRP to the terminal. As another feasible implementation manner, an implementation manner of sending, by the base station to the terminal, second CSI-RS resource configuration information not used by the terminal to report RSRP is provided in embodiments shown in FIG. 3 and FIG. 4.

Figure 3:
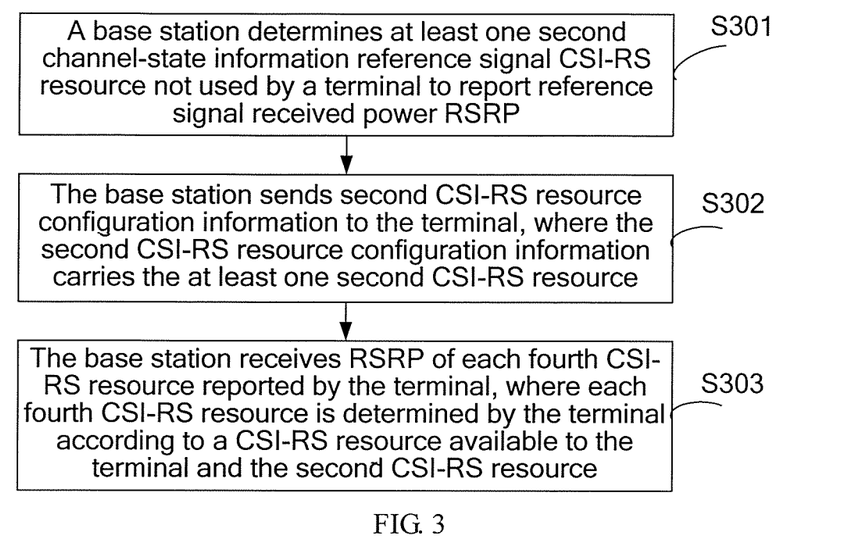
FIG. 3 is a flowchart of another embodiment of a method for reporting reference signal received power according to the present invention.

FIG. 3 is a flowchart of another embodiment of a method for reporting reference signal received power according to the present invention. As shown in FIG. 3, the method includes:

S301. A base station determines at least one second channel-state information reference signal (CSI-RS) resource not used by a terminal to report reference signal received power RSRP.

S302. The base station sends second CSI-RS resource configuration information to the terminal, where the second CSI-RS resource configuration information carries the at least one second CSI-RS resource.

S303. The base station receives RSRP of each fourth CSI-RS resource reported by the terminal, where each fourth CSI-RS resource is determined by the terminal according to a CSI-RS resource available to the terminal and the second CSI-RS resource.

The base station may determine the at least one second CSI-RS resource not used by the terminal to report RSRP and send the second CSI-RS resource configuration information to the terminal, where the second CSI-RS resource configuration information carries the at least one second CSI-RS resource.

The base station may determine one or more of multiple CSI-RS resources that are mapped to a same access point as the at least one second CSI-RS resource. After receiving the second CSI-RS resource configuration information sent by the base station, the terminal is capable of learning that RSRP is not measured for the at least one second CSI-RS resource carried in the second CSI-RS resource configuration information, thereby further saving overheads of reporting RSRP.

According to the method for reporting reference signal received power provided in this embodiment, CSI-RS resource configuration information not used by the terminal to report RSRP is sent to the terminal, so that the terminal determines, according to the available CSI-RS resource and a CSI-RS resource for skipping reporting RSRP, a CSI-RS resource used for reporting RSRP, measures RSRP on the determined CSI-RS resource and reports the RSRP to the base station, thereby saving overheads of reporting RSRP.

Figure 4:
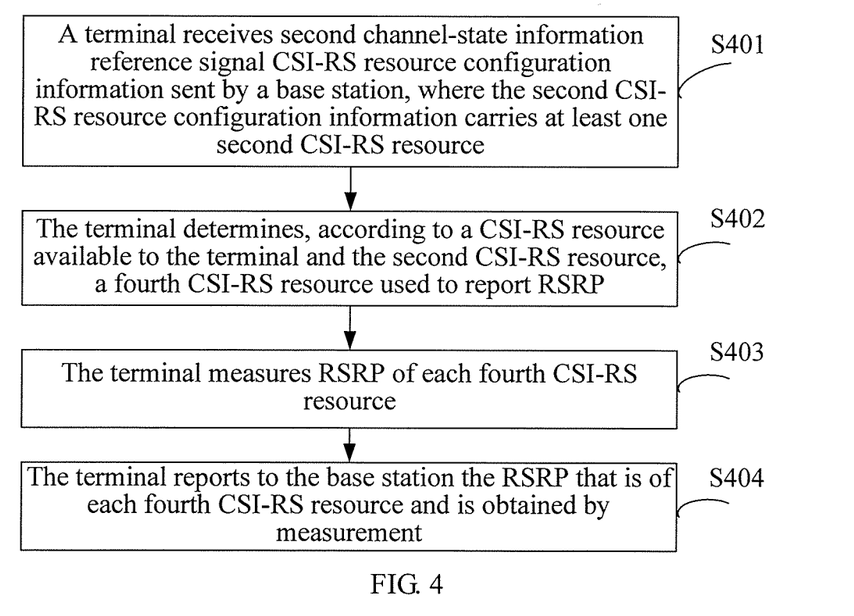
FIG. 4 is a flowchart of still another embodiment of a method for reporting reference signal received power according to the present invention.

FIG. 4 is a flowchart of still another embodiment of a method for reporting reference signal received power according to the present invention. As shown in FIG. 4, the method includes:

S401. A terminal receives second channel-state information reference signal CSI-RS resource configuration information sent by a base station, where the second CSI-RS resource configuration information carries at least one second CSI-RS resource, and the second CSI-RS resource is not used by the terminal to report reference signal received power RSRP.

S402. The terminal determines, according to a CSI-RS resource available to the terminal and the second CSI-RS resource, a fourth CSI-RS resource used to report RSRP.

S403. The terminal measures RSRP of each fourth CSI-RS resource.

S404. The terminal reports to the base station the RSRP that is of each fourth CSI-RS resource and is obtained by measurement.

After receiving the second CSI-RS resource configuration information sent by the base station and not used by the terminal to report the RSRP, the terminal may determine, according to the CSI-RS resource available to the terminal and at least one second CSI-RS resource included in the second CSI-RS resource configuration information, the fourth CSI-RS resource used to report the RSRP to the base station.

After determining the fourth CSI-RS resource used to report the RSRP, the terminal may measure the RSRP on each fourth CSI-RS resource, and report the RSRP that is on each fourth CSI-RS resource and is obtained by measurement to the base station. A process of measuring and reporting, by the terminal, the RSRP on each fourth CSI-RS resource is similar to a process of measuring and reporting, by the terminal, the RSRP on each third CSI-RS resource. For details, refer to related descriptions in the foregoing embodiments.

In the method for reporting reference signal received power provided in this embodiment, CSI-RS resource configuration information that is not used by the terminal to report RSRP and sent by the base station is received, a CSI-RS resource used to report RSRP is determined according to the available CSI-RS resource and a CSI-RS resource for skipping reporting RSRP, and RSRP is measured in the determined CSI-RS resource and reported to the base station, thereby saving overheads of reporting RSRP.

Figure 5:
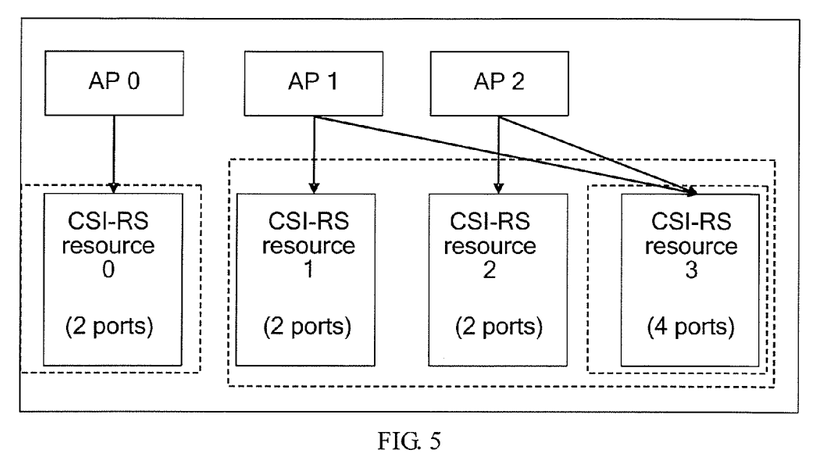
FIG. 5 is a schematic diagram of still another embodiment of a method for reporting reference signal received power according to the present invention.

FIG. 5 is a schematic diagram of still another embodiment of a method for reporting reference signal received power according to the present invention. In this embodiment, a specific implementation scenario is used to describe a process of performing the method for reporting reference signal received power.

As shown in FIG. 5, the implementation scenario involves 3 APs, that is, an AP0, an AP1, and an AP2. The APs may be cells, nodes corresponding to cells, remote radio heads (Remote Radio Head, RRH), radio remote units (Radio Remote Unit, RRU), antenna units (Antenna Unit, AU), or the like. Each AP includes two physical antennas. The implementation scenario involves 4 CSI-RS resources, that is, a CSI-RS resource (resource) 0, a CSI-RS resource 1, a CSI-RS resource 2, and a CSI-RS resource 3. The foregoing CSI-RS resources sequentially include 2, 2, 2, and 4 antenna ports. The 4 antenna ports included in the CSI-RS resource 3 are mapped to the 4 physical antennas at the AP1 and the AP2 separately.

In the method for reporting reference signal received power provided in this embodiment, a first CSI-RS resource includes the CSI-RS resource 3, a second CSI-RS resource includes the CSI-RS resource 1 and the CSI-RS resource 2, and a third CSI-RS resource includes the CSI-RS resource 0.

In an implementation scenario in which a base station sends first CSI-RS resource configuration information to a terminal, the first CSI-RS resource configuration information includes the CSI-RS resource 3, and the CSI-RS resource 3 includes 2 antenna port groups. Because the CSI-RS resource 3 includes 4 antenna ports, each antenna port group includes 2 antenna ports. After receiving the first CSI-RS configuration information, the terminal may measure RSRP of an antenna port group that includes every 2 antenna ports in the CSI-RS resource 3, and report the RSRP of the two antenna port groups included in the CSI-RS resource 3 to the base station. Alternatively, the terminal may also measure and report to the base station RSRP of the CSI-RS resource 3 and a difference between the RSRP of the CSI-RS resource 3 and RSRP of each antenna port group in the CSI-RS resource 3 separately.

In an implementation scenario in which the base station sends second CSI-RS resource configuration information to the terminal, the second CSI-RS resource includes the CSI-RS resource 1 and the CSI-RS resource 2, and the terminal may determine, according to a CSI-RS resource available to the terminal and the second CSI-RS resource, a fourth CSI-RS resource used to report RSRP. That is, the terminal may not necessarily measure the RSRP on the CSI-RS resource 1 and the CSI-RS resource 2. The terminal can measure the RSRP on the determined fourth CSI-RS resource and report the RSRP to the base station.

In an implementation scenario in which the base station sends third CSI-RS resource configuration information to the terminal, the third CSI-RS resource includes the CSI-RS resource 0, and the terminal can measure the RSRP on the CSI-RS resource 0 and report the RSRP of the CSI-RS resource 0 to the base station.

It should be noted that, existing CSI-RS resource configuration information, no matter whether it is CSI-RS resource configuration information used to report CSI, or various types of CSI-RS resource configuration information used to report RSRP, includes a ratio of energy per resource element (Energy Per Resource Element, EPRE) of a physical downlink shared channel (Physical Downlink Shared Channel, PDSCH) to EPRE of a CSI-RS, and the ratio is generally used to measure the CSI. Therefore, in order to save signaling overheads, in the embodiments of the present invention, first CSI-RS resource configuration information used to report the RSRP may not include the radio of the EPRE of the PDSCH to the EPRE of the CSI-RS.

Alternatively, the second CSI-RS resource configuration information may not include the radio of the EPRE of the PDSCH to the EPRE of the CSI-RS.

Alternatively, at least one of the first CSI-RS resource configuration information and the third CSI-RS resource configuration information may not include the radio of the EPRE of the PDSCH to the EPRE of the CSI-RS.

In addition, a quantity of ports in CSI-RS resource configuration information that corresponds to a CSI-RS resource that is determined by the base station and is used by the terminal to report RSRP may be predefined by the base station.

Figure 6:
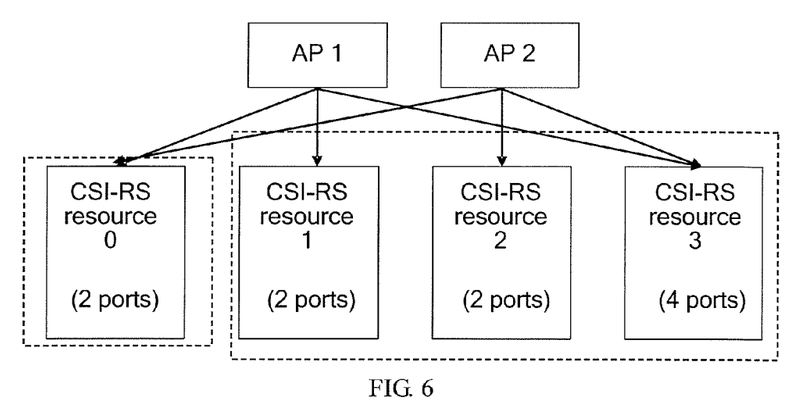
FIG. 6 is a schematic diagram of still another embodiment of a method for reporting reference signal received power according to the present invention.

FIG. 6 is a schematic diagram of still another embodiment of a method for reporting reference signal received power according to the present invention. In this embodiment, a specific implementation scenario is used to describe a process of performing the method for reporting reference signal received power.

As shown in FIG. 6, a CSI-RS resource 0 is a CSI-RS resource used to measure and report RSRP, and a CSI-RS resource 1, a CSI-RS resource 2 and a CSI-RS resource 3 are CSI-RS resources used to measure and report CSI. Each AP includes two physical antennas. Two antenna ports included in the CSI-RS resource 0 are separately mapped to physical antennas 0 at the AP1 and the AP2, and 4 antenna ports included in the CSI-RS resource 3 are separately mapped to 4 physical antennas at the AP1 and the AP2. In such an implementation scenario, if each antenna port in the CSI-RS resource 0 for a terminal serves as an antenna port group, the terminal needs to measure and report RSRP of each antenna port in the CSI-RS resource 0, and a base station may select, from the CSI-RS resource 1, the CSI-RS resource 2 and the CSI-RS resource 3 according to the 2 pieces of RSRP, a CSI-RS resource for which the terminal needs to measure and report CSI. If 2 antenna ports in the CSI-RS resource 0 for the terminal serve as an antenna port group, the terminal needs to measure and report RSRP of the antenna port group, and the base station selects, from the CSI-RS resource 1, the CSI-RS resource 2 and the CSI-RS resource 3 according to the RSRP of the antenna port group, a CSI-RS resource for which the terminal needs to measure and report CSI.

Optionally, in an implementation scenario in which the base station determines a first CSI-RS resource, the method for reporting reference signal received power provided in this embodiment may meet at least one of the following conditions:

A quantity of antenna ports included in the first CSI-RS resource determined by the base station is less than or equal to a quantity of antenna ports included in a CSI-RS resource used by the terminal to report CSI, a maximum value of the quantity of antenna ports included in the first CSI-RS resource determined by the base station is less than a maximum value of a candidate quantity of antenna ports in the CSI-RS resource used by the terminal to report the CSI, a set of quantities of antenna ports included in the first CSI-RS resource determined by the base station is smaller than a set of candidate quantities of antenna ports in the CSI-RS resource used by the terminal to report the CSI, a minimum value of a candidate value of a period of the first CSI-RS resource determined by the base station is greater than a minimum value of a candidate value of a period of the CSI-RS resource used by the terminal to report the CSI, and the period of the first CSI-RS resource determined by the base station is greater than or equal to the period of the CSI-RS resource used by the terminal to report the CSI.

Optionally, in an implementation scenario in which the base station further determines a third CSI-RS resource in addition to determining the first CSI-RS resource, the method for reporting reference signal received power provided in this embodiment may further meet at least one of the following conditions:

A quantity of antenna ports included in the first CSI-RS resource and the third CSI-RS resource that are determined by the base station is less than or equal to a quantity of antenna ports included in a CSI-RS resource used by the terminal to report CSI, a maximum value of the quantity of antenna ports included in the first CSI-RS resource and the third CSI-RS resource that are determined by the base station is less than a maximum value of a candidate quantity of antenna ports in the CSI-RS resource used by the terminal to report the CSI, a set of quantities of antenna ports included in the first CSI-RS resource and the third CSI-RS resource that are determined by the base station is smaller than a set of candidate quantities of antenna ports in the CSI-RS resource used by the terminal to report the CSI, a minimum value of candidate values of periods of the first CSI-RS resource and the third CSI-RS resource that are determined by the base station is greater than a minimum value of a candidate value of a period of the CSI-RS resource used by the terminal to report the CSI, and the periods of the first CSI-RS resource and the third CSI-RS resource that are determined by the base station are greater than or equal to the period of the CSI-RS resource used by the terminal to report the CSI.

When the CSI-RS resource used to measure and report the CSI is mapped to multiple APs, the base station may configure multiple CSI-RS resources that include a smaller quantity of ports and are used to measure and report RSRP for the terminal. In this case, all antenna ports included in a same CSI-RS resource used to measure and report RSRP may be mapped to a same AP, thereby saving signaling overheads, and measuring and reporting RSRP more flexibly. For example, the candidate quantities of antenna ports in the CSI-RS resource used by the terminal to report RSRP may be {1, 2}, and the candidate quantities of antenna ports in the CSI-RS resource used by the terminal to report CSI are {1, 2, 4, 8}. In this case, configuration information corresponding to the CSI-RS resource used by the terminal to report RSRP only needs 1 bit to indicate a quantity of ports, thereby saving signaling overheads. In addition, the base station may configure multiple CSI-RS resources that include a smaller number of antenna ports and are used to measure and report RSRP for the terminal. In this case, all antenna ports included in a same CSI-RS resource used to measure and report RSRP may be mapped to a same AP, thereby measuring and reporting RSRP more flexibly, and reducing overheads of sending, by the base station, the CSI-RS resource configuration information.

Figure 7:
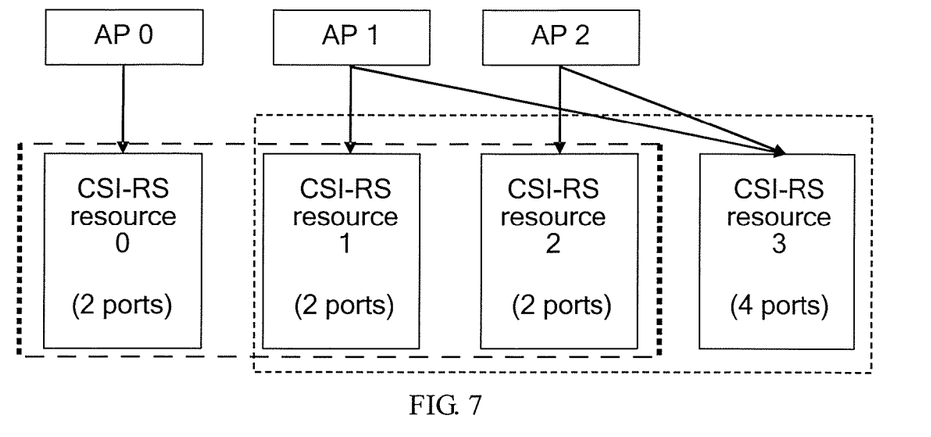
FIG. 7 is a schematic diagram of still another embodiment of a method for reporting reference signal received power according to the present invention.

FIG. 7 is a schematic diagram of still another embodiment of a method for reporting reference signal received power according to the present invention. In this embodiment, a specific implementation scenario is used to describe a process of performing the method for reporting reference signal received power.

As shown in FIG. 7, a CSI-RS resource 0, a CSI-RS resource 1 and a CSI-RS resource 2 are CSI-RS resources used to measure and report RSRP, and the CSI-RS resource 1, the CSI-RS resource 2 and a CSI-RS resource 3 are CSI-RS resources used to measure and report CSI. In such an implementation scenario, a terminal needs to measure and report only RSRP of the CSI-RS resource 0, the CSI-RS resource 1 and the CSI-RS resource 2, and a base station selects, from the CSI-RS resource 0, the CSI-RS resource 1 and the CSI-RS resource 2 according to the 3 pieces of RSRP, a CSI-RS for which the terminal needs to measure and report CSI.

A CSI-RS resource used to measure and report RSRP includes 6 antenna ports, and a CSI-RS resource used to measure and report CSI includes 8 antenna ports, that is, a quantity of antenna ports included in a CSI-RS resource used to measure and report RSRP is less than a quantity of antenna ports included in a CSI-RS resource used to measure and report CSI.

Figure 8:
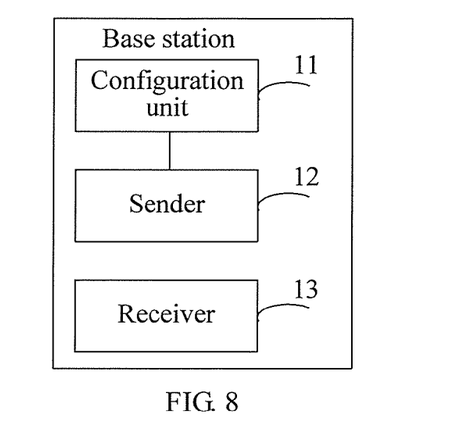
FIG. 8 is a schematic structural diagram of an embodiment of a base station according to the present invention.

FIG. 8 is a schematic structural diagram of an embodiment of a base station according to the present invention. As shown in FIG. 8, the base station includes: a configuration unit 11, a sender 12 and a receiver 13, where the configuration unit 11, is configured to determine at least one first channel-state information reference signal CSI-RS resource used by a terminal to report reference signal received power RSRP, where the first CSI-RS resource includes at least one antenna port group, and the antenna port group includes at least one antenna port;

the sender 12 is configured to send first CSI-RS resource configuration information to the terminal, where the first CSI-RS resource configuration information carries the at least one first CSI-RS resource determined by the configuration unit 11; and the receiver 13 is configured to receive RSRP that is of each antenna port group included in the first CSI-RS resource and is reported by the terminal.

Optionally, the configuration unit 11 may further be configured to determine at least one third CSI-RS resource used by the terminal to report RSRP, where the third CSI-RS resource includes at least one antenna port.

Correspondingly, the sender 12 may further be configured to send third CSI-RS resource configuration information to the terminal, where the third CSI-RS resource configuration information carries the at least one third CSI-RS resource.

The receiver 13 may further be configured to receive RSRP that is of each third CSI-RS resource and is reported by the terminal.

Optionally, the first CSI-RS resource configuration information does not include a ratio of energy per resource element EPRE of a physical downlink shared channel PDSCH to EPRE of a CSI-RS.

Optionally, at least one of the first CSI-RS resource configuration information and the third CSI-RS resource configuration information does not include a ratio of EPRE of a PDSCH to EPRE of a CSI-RS.

Optionally, the configuration unit 11 may meet at least one of the following conditions:

A quantity of antenna ports included in the first CSI-RS resource determined by the configuration unit 11 is less than or equal to a quantity of antenna ports included in a CSI-RS resource used by the terminal to report CSI, a maximum value of the quantity of antenna ports included in the first CSI-RS resource determined by the configuration unit 11 is less than a maximum value of a candidate quantity of antenna ports in the CSI-RS resource used by the terminal to report the CSI, a set of quantities of antenna ports included in the first CSI-RS resource determined by the configuration unit 11 is smaller than a set of candidate quantities of antenna ports in the CSI-RS resource used by the terminal to report the CSI, a minimum value of a candidate value of a period of the first CSI-RS resource determined by the configuration unit 11 is greater than a minimum value of a candidate value of a period of the CSI-RS resource used by the terminal to report the CSI, and the period of the first CSI-RS resource determined by the configuration unit 11 is greater than or equal to the period of the CSI-RS resource used by the terminal to report the CSI.

Optionally, the configuration unit 11 may further meet at least one of the following conditions:

A quantity of antenna ports included in the first CSI-RS resource and the third CSI-RS resource that are determined by the configuration unit 11 is less than or equal to a quantity of antenna ports included in a CSI-RS resource used by the terminal to report CSI, a maximum value of the quantity of antenna ports included in the first CSI-RS resource and the third CSI-RS resource that are determined by the configuration unit 11 is less than a maximum value of a candidate quantity of antenna ports in the CSI-RS resource used by the terminal to report the CSI, a set of quantities of antenna ports included in the first CSI-RS resource and the third CSI-RS resource that are determined by the configuration unit 11 is smaller than a set of candidate quantities of antenna ports in the CSI-RS resource used by the terminal to report the CSI, a minimum value of candidate values of periods of the first CSI-RS resource and the third CSI-RS resource that are determined by the configuration unit 11 is greater than a minimum value of a candidate value of a period of the CSI-RS resource used by the terminal to report the CSI, and the periods of the first CSI-RS resource and the third CSI-RS resource that are determined by the configuration unit 11 are greater than or equal to the period of the CSI-RS resource used by the terminal to report the CSI.

The base station provided in the embodiment of the present invention, corresponding to the method for reporting reference signal received power provided in the embodiment of the present invention, is a device for performing the method for reporting reference signal received power provided in the present invention. For a process of performing, by the device, the method for reporting reference signal received power, reference may be made to the method embodiment provided in the present invention, which is not described herein again.

The base station provided in the embodiment of the present invention sends to the terminal CSI-RS resource configuration information that is used by the terminal to report RSRP and includes antenna port groups, so that the terminal measures RSRP of each antenna port group and reports the RSRP to the base station, thereby saving overheads of reporting RSRP.

Figure 9:
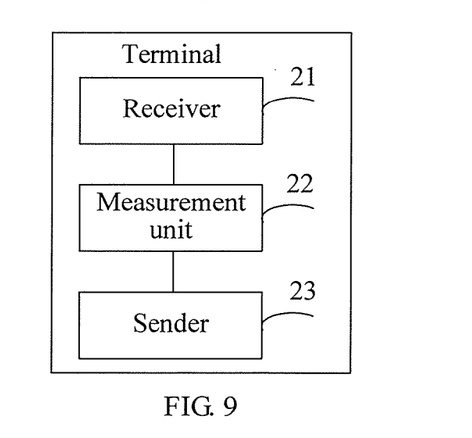
FIG. 9 is a schematic structural diagram of an embodiment of a terminal according to the present invention.

FIG. 9 is a schematic structural diagram of an embodiment of a terminal according to the present invention. As shown in FIG. 9, the terminal includes: a receiver 21, a measurement unit 22 and a sender 23, where the receiver 21 is configured to receive first channel-state information reference signal CSI-RS resource configuration information sent by a base station, where the first CSI-RS resource configuration information carries at least one first CSI-RS resource used by the terminal to report reference signal received power RSRP, the first CSI-RS resource includes the number of at least one antenna port group and an antenna port group, and the antenna port group includes at least one antenna port;

the measurement unit 22 is configured to measure, according to the first CSI-RS resource configuration information received by the receiver 21, RSRP of each antenna port group included in the first CSI-RS resource; and the sender 23 is configured to report to the base station the RSRP that is of each antenna port group included in the first CSI-RS resource and is obtained by measurement by the measurement unit 22.

Optionally, the measurement unit 22 is specifically configured to directly measure the RSRP of each antenna port group, and the sender 23 is specifically configured to report the RSRP of each antenna port group to the base station.

Alternatively, the measurement unit 22 is specifically configured to measure RSRP of each first CSI-RS resource and the RSRP of each antenna port group in the first CSI-RS resource; and the sender 23 is specifically configured to report a difference between the RSRP of each first CSI-RS resource and the RSRP of each antenna port group in the first CSI-RS resource to the base station, where the RSRP of each first CSI-RS resource includes an average value of the RSRP of all the antenna port groups in the first CSI-RS resource.

Alternatively, the measurement unit 22 is specifically configured to measure RSRP of any of the at least one first CSI-RS resource and RSRP of each antenna port group in all the first CSI-RS resources; and the sender 23 is specifically configured to report a difference between the RSRP of the any of the at least one first CSI-RS resource and the RSRP of each antenna port group among RSRP of all the first CSI-RS resources to the base station, where the RSRP of the any of the at least one first CSI-RS resource includes an average value of the RSRP of all the antenna port groups in the any of the at least one first CSI-RS resource.

Optionally, the measurement unit 22 may further be configured to obtain, according to the RSRP of each antenna port group, a sum of the RSRP of all the antenna port groups included in the first CSI-RS resource, or an average value of the RSRP of all the antenna port groups included in the first CSI-RS resource, or a weighted average value of the RSRP of all the antenna port groups included in the first CSI-RS resource.

Correspondingly, the sender 23 may further be configured to report to the base station the sum of the RSRP of all the antenna port groups included in the first CSI-RS resource, or the average value of the RSRP of all the antenna port groups included in the first CSI-RS resource, or the weighted average value of the RSRP of all the antenna port groups included in the first CSI-RS resource.

Optionally, the receiver 21 may further be configured to receive third CSI-RS resource configuration information sent by the base station, where the third CSI-RS resource configuration information carries at least one third CSI-RS resource used by the terminal to report RSRP, and the third CSI-RS resource includes at least one antenna port.

Correspondingly, the measurement unit 22 may further be configured to measure RSRP of each third CSI-RS resource according to the third CSI-RS resource configuration information.

Correspondingly, the sender 23 may further be configured to report to the base station the RSRP that is of each third CSI-RS resource and is obtained by measurement by the measurement unit 22.

Optionally, the measurement unit 22 may further be configured to obtain, according to the RSRP of each third CSI-RS resource, a sum of the RSRP of all the third CSI-RS resources, or an average value of the RSRP of all the third CSI-RS resources, or a weighted average value of the RSRP of all the third CSI-RS resources.

Correspondingly, the sender 23 may further be configured to report the sum of the RSRP of all the third CSI-RS resources, or the average value of the RSRP of all the third CSI-RS resources, or the weighted average value of the RSRP of all the third CSI-RS resources to the base station.

The terminal provided in the embodiment of the present invention, corresponding to the method for reporting reference signal received power provided in the embodiment of the present invention, is a device for performing the method for reporting reference signal received power provided in the present invention. For a process of performing, by the device, the method for reporting reference signal received power, reference may be made to the method embodiment provided in the present invention, which is not described herein again.

The terminal provided in the embodiment of the present invention receives CSI-RS resource configuration information that is sent by the base station, used by the terminal to report RSRP, and includes antenna port groups, so that the terminal measures RSRP of each antenna port group and reports the RSRP to the base station, thereby saving overheads of reporting RSRP.

Figure 10:
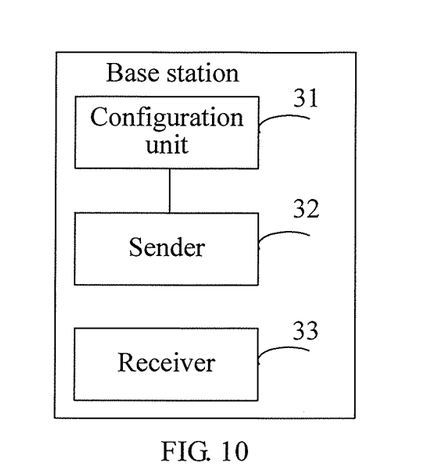
FIG. 10 is a schematic structural diagram of another embodiment of a base station according to the present invention.

FIG. 10 is a schematic structural diagram of an embodiment of a base station according to the present invention. As shown in FIG. 10, the base station includes: a configuration unit 31, a sender 32, and a receiver 33, where the configuration unit 31 is configured to determine at least one second channel-state information reference signal CSI-RS resource not used by a terminal to report reference signal received power RSRP;

the sender 32 is configured to send second CSI-RS resource configuration information to the terminal, where the second CSI-RS resource configuration information carries the at least one second CSI-RS resource; and the receiver 33 is configured to receive RSRP that is of each fourth CSI-RS resource and is reported by the terminal, where each fourth CSI-RS resource is determined by the terminal according to a CSI-RS resource available to the terminal and the second CSI-RS resource.

The base station provided in this embodiment, corresponding to the method for reporting reference signal received power provided in the embodiment of the present invention, is a device for performing the method for reporting reference signal received power provided in the present invention. For a process of performing, by the device, the method for reporting reference signal received power, reference may be made to the method embodiment provided in the present invention, which is not described herein again.

The base station provided in this embodiment sends to the terminal CSI-RS resource configuration information that is not used by the terminal to report RSRP, so that the terminal determines, according to the available CSI-RS resource and a CSI-RS resource for skipping reporting RSRP, a CSI-RS resource used to report RSRP, measures RSRP on the determined CSI-RS resource and reports the RSRP to the base station, thereby saving overheads of reporting RSRP.

Figure 11:
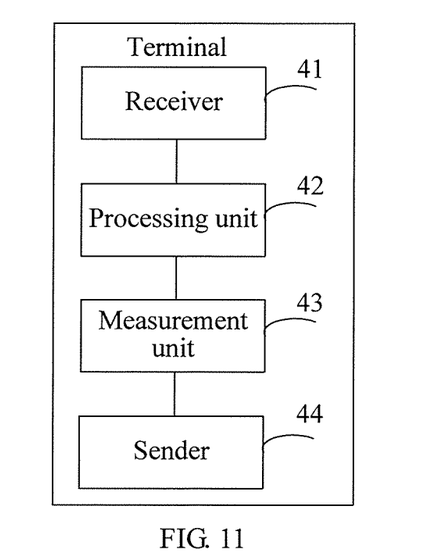
FIG. 11 is a schematic structural diagram of another embodiment of a terminal according to the present invention.

FIG. 11 is a schematic structural diagram of an embodiment of a terminal according to the present invention. As shown in FIG. 11, the terminal includes: a receiver 41, a processing unit 42, a measurement unit 43 and a sender 44, where the receiver 41 is configured to receive second channel-state information reference signal CSI-RS resource configuration information sent by a base station, where the second CSI-RS resource configuration information carries at least one second CSI-RS resource, and the second CSI-RS resource is not used by the terminal to report reference signal received power RSRP;

the processing unit 42 is configured to determine, according to a CSI-RS resource available to the terminal and the second CSI-RS resource, a fourth CSI-RS resource used to report RSRP;

the measurement unit 43 is configured to measure RSRP of each fourth CSI-RS resource; and the sender 44 is configured to report to the base station the RSRP that is of each fourth CSI-RS resource and is obtained by measurement.

The terminal provided in this embodiment, corresponding to the method for reporting reference signal received power provided in the embodiment of the present invention, is a device for performing the method for reporting reference signal received power provided in the present invention. For a process of performing, by the device, the method for reporting reference signal received power, reference may be made to the method embodiment provided in the present invention, which is not described herein again.

The terminal provided in this embodiment receives CSI-RS resource configuration information that is not used by the terminal to report RSRP and sent by the base station, determines, according to the available CSI-RS resource and a CSI-RS resource for skipping reporting RSRP, a CSI-RS resource used to report RSRP, measures RSRP on the determined CSI-RS resource and reports the RSRP to the base station, thereby saving overheads of reporting RSRP.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for reporting reference signal received power, the method comprising:
   determining, by a base station, at least one first channel-state information reference signal (CSI-RS) resource used by a terminal to report reference signal received power (RSRP), wherein the first CSI-RS resource comprises at least one antenna port group, and the antenna port group comprises at least one antenna port;
   sending, by the base station, first CSI-RS resource configuration information to the terminal, wherein the first CSI-RS resource configuration information carries the at least one first CSI-RS resource; and
   receiving, by the base station, RSRP that is of each antenna port group comprised in the first CSI-RS resource and is reported by the terminal;
   wherein the first CSI-RS resource configuration information does not comprise a ratio of energy per resource element (EPRE) of a physical downlink shared channel (PDSCH) to EPRE of a CSI-RS.

2. A base station, comprising:
   a configuration unit, configured to determine at least one first channel-state information reference signal (CSI-RS) resource used by a terminal to report reference signal received power (RSRP), wherein the first CSI-RS resource comprises at least one antenna port group, and the antenna port group comprises at least one antenna port;
   a sender, configured to send first CSI-RS resource configuration information to the terminal, wherein the first CSI-RS resource configuration information carries the at least one first CSI-RS resource determined by the configuration unit; and
   a receiver, configured to receive RSRP that is of each antenna port group comprised in the first CSI-RS resource and is reported by the terminal;
   wherein the configuration unit meets at least one of the following conditions:
      a quantity of antenna ports comprised in the first CSI-RS resource determined by the configuration unit is less than or equal to a quantity of antenna ports comprised in a CSI-RS resource used by the terminal to report CSI;
      a maximum value of the quantity of the antenna ports comprised in the first CSI-RS resource determined by the configuration unit is less than a maximum value of a candidate quantity of antenna ports in the CSI-RS resource used by the terminal to report the CSI;
      a set of quantities of antenna ports comprised in the first CSI-RS resource determined by the configuration unit is smaller than a set of candidate quantities of antenna ports in the CSI-RS resource used by the terminal to report the CSI;
      a minimum value of a candidate value of a period of the first CSI-RS resource determined by the configuration unit is greater than a minimum value of a candidate value of a period of the CSI-RS resource used by the terminal to report the CSI; and
      the period of the first CSI-RS resource determined by the configuration unit is greater than or equal to the period of the CSI-RS resource used by the terminal to report the CSI.

3. A base station, comprising:
   a configuration unit, configured to determine at least one first channel-state information reference signal (CSI-RS) resource used by a terminal to report reference signal received power (RSRP), wherein the first CSI-RS resource comprises at least one antenna port group, and the antenna port group comprises at least one antenna port;
   a sender, configured to send first CSI-RS resource configuration information to the terminal, wherein the first CSI-RS resource configuration information carries the at least one first CSI-RS resource determined by the configuration unit; and
   a receiver, configured to receive RSRP that is of each antenna port group comprised in the first CSI-RS resource and is reported by the terminal
   wherein:
      the configuration unit is further configured to determine at least one third CSI-RS resource used by the terminal to report RSRP, wherein the third CSI-RS resource comprises at least one antenna port;

the sender is further configured to send third CSI-RS resource configuration information to the terminal, wherein the third CSI-RS resource configuration information carries the at least one third CSI-RS resource; and the receiver is further configured to receive RSRP that is of each third CSI-RS resource and is reported by the terminal;

wherein the configuration unit meets at least one of the following conditions:

a quantity of antenna ports comprised in the first CSI-RS resource and the third CSI-RS resource that are determined by the configuration unit is less than or equal to a quantity of antenna ports comprised in a CSI-RS resource used by the terminal to report CSI;

a maximum value of the quantity of antenna ports comprised in the first CSI-RS resource and the third CSI-RS resource that are determined by the configuration unit is less than a maximum value of a candidate quantity of antenna ports in the CSI-RS resource used by the terminal to report the CSI;

a set of quantities of antenna ports comprised in the first CSI-RS resource and the third CSI-RS resource that are determined by the configuration unit is smaller than a set of candidate quantities of antenna ports in the CSI-RS resource used by the terminal to report the CSI;

a minimum value of candidate values of periods of the first CSI-RS resource and the third CSI-RS resource that are determined by the configuration unit is greater than a minimum value of a candidate value of a period of the CSI-RS resource used by the terminal to report the CSI; and the periods of the first CSI-RS resource and the third CSI-RS resource that are determined by the configuration unit are greater than or equal to the period of the CSI-RS resource used by the terminal to report the CSI.

4. A method for reporting reference signal received power, the method comprising:

determining, by a base station, at least one first channel-state information reference signal (CSI-RS) resource used by a terminal to report reference signal received power (RSRP), wherein the first CSI-RS resource comprises at least one antenna port group, and the antenna port group comprises at least one antenna port;

sending, by the base station, first CSI-RS resource configuration information to the terminal, wherein the first CSI-RS resource configuration information carries the at least one first CSI-RS resource;

receiving, by the base station, RSRP that is of each antenna port group comprised in the first CSI-RS resource and is reported by the terminal;

determining, by the base station, at least one third CSI-RS resource used by the terminal to report RSRP, wherein the third CSI-RS resource comprises at least one antenna port;

sending, by the base station, third CSI-RS resource configuration information to the terminal, wherein the third CSI-RS resource configuration information carries the at least one third CSI-RS resource; and receiving, by the base station, RSRP that is of each third CSI-RS resource and is reported by the terminal;

wherein at least one of the first CSI-RS resource configuration information and the third CSI-RS resource configuration information does not comprise a ratio of energy per resource element (EPRE) of a physical downlink shared channel (PDSCH) to EPRE of a CSI-RS.

5. A method for reporting reference signal received power, the method comprising:

determining, by a base station, at least one first channel-state information reference signal (CSI-RS) resource used by a terminal to report reference signal received power (RSRP), wherein the first CSI-RS resource comprises at least one antenna port group, and the antenna port group comprises at least one antenna port;

sending, by the base station, first CSI-RS resource configuration information to the terminal, wherein the first CSI-RS resource configuration information carries the at least one first CSI-RS resource; and receiving, by the base station, RSRP that is of each antenna port group comprised in the first CSI-RS resource and is reported by the terminal;

wherein the method meets at least one of the following conditions:

a quantity of antenna ports comprised in the first CSI-RS resource determined by the base station is less than or equal to a quantity of antenna ports comprised in a CSI-RS resource used by the terminal to report CSI;

a maximum value of the quantity of antenna ports comprised in the first CSI-RS resource determined by the base station is less than a maximum value of a candidate quantity of antenna ports in the CSI-RS resource used by the terminal to report the CSI;

a set of quantities of antenna ports comprised in the first CSI-RS resource determined by the base station is smaller than a set of candidate quantities of antenna ports in the CSI-RS resource used by the terminal to report the CSI;

a minimum value of a candidate value of a period of the first CSI-RS resource determined by the base station is greater than a minimum value of a candidate value of a period of the CSI-RS resource used by the terminal to report the CSI; and the period of the first CSI-RS resource determined by the base station is greater than or equal to the period of the CSI-RS resource used by the terminal to report the CSI.

6. A method for reporting reference signal received power, the method comprising:

determining, by a base station, at least one first channel-state information reference signal (CSI-RS) resource used by a terminal to report reference signal received power (RSRP), wherein the first CSI-RS resource comprises at least one antenna port group, and the antenna port group comprises at least one antenna port;

sending, by the base station, first CSI-RS resource configuration information to the terminal, wherein the first CSI-RS resource configuration information carries the at least one first CSI-RS resource;

receiving, by the base station, RSRP that is of each antenna port group comprised in the first CSI-RS resource and is reported by the terminal;

determining, by the base station, at least one third CSI-RS resource used by the terminal to report RSRP, wherein the third CSI-RS resource comprises at least one antenna port;

sending, by the base station, third CSI-RS resource configuration information to the terminal, wherein the third CSI-RS resource configuration information carries the at least one third CSI-RS resource; and receiving, by the base station, RSRP that is of each third CSI-RS resource and is reported by the terminal;

wherein the method meets at least one of the following conditions:
- a quantity of antenna ports comprised in the first CSI-RS resource and the third CSI-RS resource that are determined by the base station is less than or equal to a quantity of antenna ports comprised in a CSI-RS resource used by the terminal to report CSI;
- a maximum value of the quantity of antenna ports comprised in the first CSI-RS resource and the third CSI-RS resource that are determined by the base station is less than a maximum value of a candidate quantity of antenna ports in the CSI-RS resource used by the terminal to report the CSI;
- a set of quantities of antenna ports comprised in the first CSI-RS resource and the third CSI-RS resource that are determined by the base station is smaller than a set of candidate quantities of antenna ports in the CSI-RS resource used by the terminal to report the CSI;
- a minimum value of candidate values of periods of the first CSI-RS resource and the third CSI-RS resource that are determined by the base station is greater than a minimum value of a candidate value of a period of the CSI-RS resource used by the terminal to report the CSI; and
- the periods of the first CSI-RS resource and the third CSI-RS resource that are determined by the base station are greater than or equal to the period of the CSI-RS resource used by the terminal to report the CSI.

7. A method for reporting reference signal received power, the method comprising:

receiving, by a terminal, first channel-state information reference signal (CSI-RS) resource configuration information sent by a base station, wherein the first CSI-RS resource configuration information carries at least one first CSI-RS resource used by the terminal to report reference signal received power (RSRP), the first CSI-RS resource comprises at least one antenna port group, and the antenna port group comprises at least one antenna port;

measuring, by the terminal according to the first CSI-RS resource configuration information, RSRP of each antenna port group comprised in the first CSI-RS resource; and reporting, by the terminal to the base station, the RSRP that is of each antenna port group comprised in the first CSI-RS resource and is obtained by measurement;

wherein the first CSI-RS resource configuration information does not comprise a ratio of energy per resource element (EPRE) of a physical downlink shared channel (PDSCH) to EPRE of a CSI-RS.

8. The method according to claim 7, wherein measuring, by the terminal according to the first CSI-RS resource configuration information, RSRP of each antenna port group comprised in the first CSI-RS resource; and reporting, by the terminal to the base station, the RSRP that is of each antenna port group comprised in the first CSI-RS resource and is obtained by measurement, comprise:

directly measuring, by the terminal, the RSRP of each antenna port group, and reporting the RSRP of each antenna port group to the base station; or measuring, by the terminal, RSRP of each first CSI-RS resource and the RSRP of each antenna port group in the first CSI-RS resource, and reporting a difference between the RSRP of each first CSI-RS resource and the RSRP of each antenna port group in the first CSI-RS resource to the base station, wherein the RSRP of each first CSI-RS resource comprises an average value of the RSRP of all the antenna port groups in the first CSI-RS resource; or measuring, by the terminal, RSRP of any of the at least one first CSI-RS resource and RSRP of each antenna port group in all the first CSI-RS resources, and reporting a difference between the RSRP of the any of the at least one first CSI-RS resource and the RSRP of each antenna port group among RSRP of all the first CSI-RS resources to the base station, wherein the RSRP of the any of the at least one first CSI-RS resources comprises an average value of the RSRP of all the antenna port groups in the any of the at least one first CSI-RS resource.

9. The method according to claim 7, wherein after measuring, by the terminal according to the first CSI-RS resource configuration information, RSRP of each antenna port group comprised in the first CSI-RS resource, the method further comprises:

obtaining, by the terminal according to the RSRP of each antenna port group, a sum of the RSRP of all the antenna port groups comprised in the first CSI-RS resource, or an average value of the RSRP of all the antenna port groups comprised in the first CSI-RS resource, or a weighted average value of the RSRP of all the antenna port groups comprised in the first CSI-RS resource; and reporting, by the terminal to the base station, the sum of the RSRP of all the antenna port groups comprised in the first CSI-RS resource, or the average value of the RSRP of all the antenna port groups comprised in the first CSI-RS resource, or the weighted average value of the RSRP of all the antenna port groups comprised in the first CSI-RS resource.

10. The method according to claim 7, further comprising:

receiving, by the terminal, third CSI-RS resource configuration information sent by the base station, wherein the third CSI-RS resource configuration information carries at least one third CSI-RS resource used by the terminal to report RSRP, and the third CSI-RS resource comprises at least one antenna port;

measuring, by the terminal, RSRP of each third CSI-RS resource according to the third CSI-RS resource configuration information; and reporting, by the terminal to the base station, the RSRP that is of each third CSI-RS resource and is obtained by measurement.

11. The method according to claim 10, wherein after measuring, by the terminal, RSRP of each third CSI-RS resource according to the third CSI-RS resource configuration information, the method further comprises:

obtaining, by the terminal according to the RSRP of each third CSI-RS resource, a sum or an average value or a weighted average value of the RSRP of all the third CSI-RS resources; and reporting, by the terminal to the base station, the sum of the RSRP of all the third CSI-RS resources, or the average value of the RSRP of all the third CSI-RS resources, or the weighted average value of the RSRP of all the third CSI-RS resources.

12. A base station, comprising:

a configuration unit, configured to determine at least one first channel-state information reference signal (CSI-RS) resource used by a terminal to report reference signal received power (RSRP), wherein the first CSI-RS resource comprises at least one antenna port group, and the antenna port group comprises at least one antenna port;
a sender, configured to send first CSI-RS resource configuration information to the terminal, wherein the first CSI-RS resource configuration information carries the at least one first CSI-RS resource determined by the configuration unit; and
a receiver, configured to receive RSRP that is of each antenna port group comprised in the first CSI-RS resource and is reported by the terminal;
wherein the first CSI-RS resource configuration information does not comprise a ratio of energy per resource element (EPRE) of a physical downlink shared channel (PDSCH) to EPRE of a CSI-RS.

13. A base station, comprising:
a configuration unit, configured to determine at least one first channel-state information reference signal (CSI-RS) resource used by a terminal to report reference signal received power (RSRP), wherein the first CSI-RS resource comprises at least one antenna port group, and the antenna port group comprises at least one antenna port;
a sender, configured to send first CSI-RS resource configuration information to the terminal, wherein the first CSI-RS resource configuration information carries the at least one first CSI-RS resource determined by the configuration unit; and
a receiver, configured to receive RSRP that is of each antenna port group comprised in the first CSI-RS resource and is reported by the terminal;
wherein:
    the configuration unit is further configured to determine at least one third CSI-RS resource used by the terminal to report RSRP, wherein the third CSI-RS resource comprises at least one antenna port;
    the sender is further configured to send third CSI-RS resource configuration information to the terminal, wherein the third CSI-RS resource configuration information carries the at least one third CSI-RS resource; and
    the receiver is further configured to receive RSRP that is of each third CSI-RS resource and is reported by the terminal;
wherein at least one of the first CSI-RS resource configuration information and the third CSI-RS resource configuration information does not comprise a ratio of energy per resource element (EPRE) of a physical downlink shared channel (PDSCH) to EPRE of a CSI-RS.

14. A terminal, comprising:
a receiver, configured to receive first channel-state information reference signal (CSI-RS) resource configuration information sent by a base station, wherein the first CSI-RS resource configuration information carries at least one first CSI-RS resource used by the terminal to report reference signal received power (RSRP), the first CSI-RS resource comprises at least one antenna port group, and the antenna port group comprises at least one antenna port;
a measurement unit, configured to measure, according to the first CSI-RS resource configuration information received by the receiver, RSRP of each antenna port group comprised in the first CSI-RS resource; and
a sender, configured to report to the base station the RSRP that is of each antenna port group comprised in the first CSI-RS resource and is obtained by measurement by the measurement unit;
wherein the first CSI-RS resource configuration information does not comprise a ratio of energy per resource element (EPRE) of a physical downlink shared channel (PDSCH) to EPRE of a CSI-RS.

15. The terminal according to claim 14, wherein:
the measurement unit is configured to directly measure the RSRP of each antenna port group, and the sender is configured to report the RSRP of each antenna port group to the base station; or
the measurement unit is configured to measure RSRP of each first CSI-RS resource and the RSRP of each antenna port group in the first CSI-RS resource, and the sender is configured to report a difference between the RSRP of each first CSI-RS resource and the RSRP of each antenna port group in the first CSI-RS resource to the base station, wherein the RSRP of each first CSI-RS resource comprises an average value of the RSRP of all the antenna port groups in the first CSI-RS resource; or
the measurement unit is configured to measure RSRP of any of the at least one first CSI-RS resource and RSRP of each antenna port group in all the first CSI-RS resources, and the sender is configured to report a difference between the RSRP of the any of the at least one first CSI-RS resource and the RSRP of each antenna port group among RSRP of all the first CSI-RS resources to the base station, wherein the RSRP of the any of the at least one first CSI-RS resource comprises an average value of the RSRP of all the antenna port groups in the any of the at least one first CSI-RS resource.

16. The terminal according to claim 14, wherein:
the measurement unit is further configured to obtain, according to the RSRP of each antenna port group, a sum of the RSRP of all the antenna port groups comprised in the first CSI-RS resource, or an average value of the RSRP of all the antenna port groups comprised in the first CSI-RS resource, or a weighted average value of the RSRP of all the antenna port groups comprised in the first CSI-RS resource; and
the sender is further configured to report to the base station the sum of the RSRP of all the antenna port groups comprised in the first CSI-RS resource, or the average value of the RSRP of all the antenna port groups comprised in the first CSI-RS resource, or the weighted average value of the RSRP of all the antenna port groups comprised in the first CSI-RS resource.

17. The terminal according to claim 14, wherein:
the receiver is further configured to receive third CSI-RS resource configuration information sent by the base station, wherein the third CSI-RS resource configuration information carries at least one third CSI-RS resource used by the terminal to report RSRP, and the third CSI-RS resource comprises at least one antenna port;
the measurement unit is further configured to measure RSRP of each third CSI-RS resource according to the third CSI-RS resource configuration information; and
the sender is further configured to report to the base station, the RSRP that is of each third CSI-RS resource and is obtained by measurement by the measurement unit.

18. The terminal according to claim 17, wherein:
the measurement unit is further configured to obtain, according to the RSRP of each third CSI-RS resource, a sum of the RSRP of all the third CSI-RS resources, or an average value of the RSRP of all the third CSI-RS resources, or a weighted average value of the RSRP of all the third CSI-RS resources; and
the sender is further configured to report to the base station the sum of the RSRP of all the third CSI-RS resources, or the average value of the RSRP of all the third CSI-RS resources, or the weighted average value of the RSRP of all the third CSI-RS resources.

\* \* \* \* \*